June 9, 1936.  C. B. STRAUCH  2,043,633
COMPOSITION AND METHOD FOR PRODUCING STABILIZED FOAM
Filed June 10, 1932
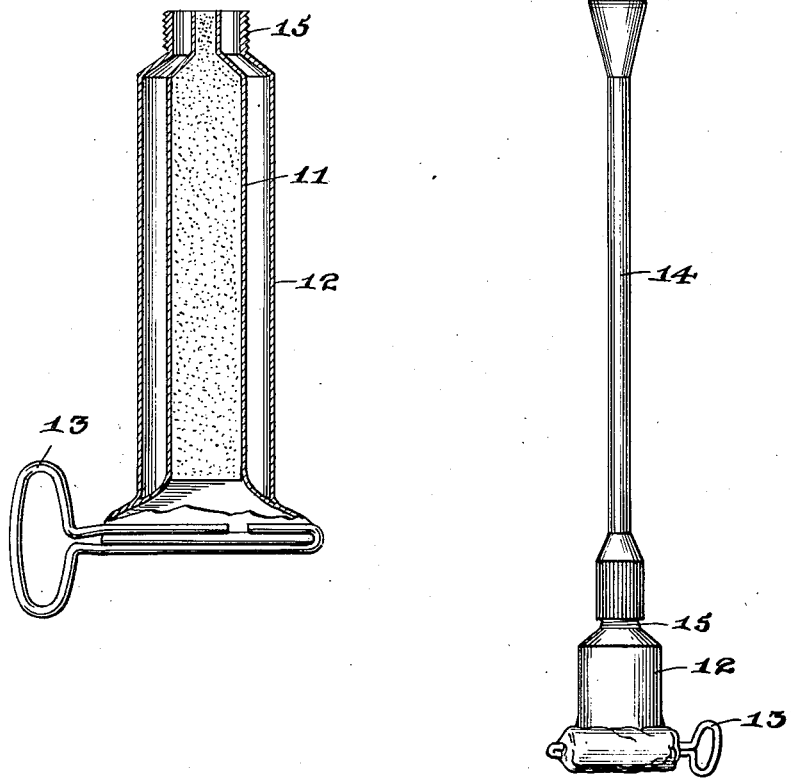
Inventor
Claus B. Strauch
By Seymour & Bright
Attorneys Patented June 9, 1936

2,043,633

UNITED STATES PATENT OFFICE 2,043,633

COMPOSITION AND METHOD FOR PRODUCING STABILIZED FOAM

Clauss B. Strauch, New York, N. Y.

Application June 10, 1932, Serial No. 616,568

6 Claims. (Cl. 167—58)

The present invention relates generically to stabilized foams and to a novel method of producing the same. More particularly, it has especial relation to stabilized foams designed primarily for use as carriers for drugs, particularly antiseptics.

It is well known that the majority of drugs, particularly antiseptics require prolonged contact with the tissues of the body to produce satisfactory results. This is particularly true of drugs and antiseptics used in vaginal treatment and feminine hygiene.

It is also of importance, especially in the treatment of body cavities that the antiseptic or other medicinal preparation be positively brought into contact with the entire surface of the wall of the cavity.

Heretofore, the application of drugs and antiseptics to the vaginal canal or to other body cavities has been accomplished by means of irrigation, effervescent tablets, capsules, jellies and the like. The disadvantage of all of these methods are that positive contact between the drug or antiseptic and the entire tissue to be medicated is not assured and that the duration of such contact is relatively short.

One of the objects of the present invention is to produce a stabilized foam adapted to be used as a carrier for drugs or antiseptics which shall have such stable, self-expanding and tenacious characteristics as to enable it to reach every crevice and fold of the body cavity into which it may be introduced thereby assuring positive contact between every portion of the tissue to be medicated and the carrier-foam.

It is a further object of the invention to produce a foam of the character outlined which shall be of such stability and tenacity as to maintain the desired contact therebetween and the tissue being medicated, for a prolonged period of time, for example, for about at least four hours.

Other objects of the invention will be evident from the description thereof hereinafter set forth.

The accompanying sheet of drawing illustrates one form of double compartment tube applicator adapted for use in carrying out the present invention, although the invention is obviously independent of any particular applicator.

On the said sheet of drawing:

Fig. 1 is a view, partly in elevation and partly in section, of a two-compartment tube adapted for use in connection with the present invention;

Fig. 2 is a view of a tube and applicator, the tube contents being partly squeezed out, the resultant foam being shown somewhat diagrammatically.

The basic principle upon which the novel foam is produced according to the present invention is that involved in the interaction between an alkaline and an acid jelly to form a self-developing or self-expanding foam.

The invention rests upon the discovery that a highly tenacious and stable foam comprising a multitude of fine bubbles can be produced by the suitable treatment of gum karaya ("Indian gum" from *Sterculia urens, Cochlospermum gossypium* and related gum plants), and that the treated karaya may be used either as the alkaline or acid jelly in the production of such a foam.

It has been discovered that gum karaya may be transformed from the rather rough, granular and cloudy mucilage which it forms under ordinary cicrumstances into a slimy mass by treating the gum with any alkali, such for example as 2% trisodium phosphate, and that the resultant slimy state is maintained unchanged when the treated karaya is subsequently rendered acid, as for instance by the addition of 5% tartaric acid.

The following examples will serve to illustrate the preparation of alkaline and acid jellies and the formation of foam therefrom:

A. Twenty grams of karaya and 1000 cc. of water are worked up into a paste, and 50 g. of sodium bicarbonate are added. The mixture is allowed to stand for 5 days so that it may attain maximum stringency. (By additionally adding 20 g. of an alkali, such as trisodium phosphate, suitable stringency is effected in an hour. Alternatively, 20 g. of karaya may be boiled in 1000 cc. of water with 20 g. of borax for 1⅓ hours, and the sodium bicarbonate added after cooling).

B. Twenty grams of karaya and 1000 cc. of water are worked up into a paste, 20 g. of trisodium phosphate are added, and the mixture allowed to stand for an hour (or the paste may be boiled with 20 g. of borax for 1½ hours). After the paste has become stringent, it is rendered acid by addition of an excess of a suitable acid, e. g. 50 g. of boric acid activated by 250 cc. of glycerin.

Upon admixture of the alkaline jelly A and acid jelly B, a highly tenacious and stable foam is formed.

Either or both of the jellies may include suitable antiseptic, medicinal or other ingredients. It may be sufficient in some cases to have only one of the jelly bases, either A or B, comprise karaya gum, the other part being made of any other basis.

It has been found that the foam may be still further improved especially with respect to the size of the bubbles by including an additional gum of the gum arabic type (e. g., gum Acacia, gum Gatti, etc.) in either the acid or alkaline jelly or both.

An important feature of the present invention is the use, in the acid jelly, of an antiseptic weakly acidic or normally alkaline compound, which is pretreated or activated by the addition of a neutral substance, such as glycerin, manitol, invert sugar, etc., so that an acid reaction results which is sufficient to cause liberation of carbon dioxid from a carbonate salt, such as sodium bicarbonate. The evolved gas may be used to convert the jelly into a luxurious foam.

Borax, for instance, in aqueous solution gives an alkaline reaction. Upon addition of glycerin, however, the mixture gives a pronounced acid reaction, although glycerin itself is a tertiary alcohol and possesses little or no active acidity.

Boric acid and other salts of boron may be activated in similar manner. Boric acid, which is a well known antiseptic, is so weak an acid that it will cause hardly any liberation of $CO_2$ upon addition thereof to a carbonate. When glycerin is added, however, $CO_2$ is rapidly evolved.

The effect of the addition of the activator may be seen from the following example:

Reagents are prepared as follows:

A. Twenty grams of karaya and 1000 cc. of water are formed into a paste, and 50 g. of sodium bicarbonate are added. The result is an alkaline jelly.

B. A weakly acid jelly is produced by admixing 20 g. of karaya and 1000 cc. of water to form a paste in which 40 g. of boric acid are dissolved by heating.

C. 1000 cc. of glycerin.

Reagents A and B, upon admixture, will produce no foam, nor will a mixture of reagents A and C or of reagents B and C. A mixture of all three reagents, however, results in a rapid and copious evolution of gas and the formation of an excellent foam.

In use, glycerin or other suitable activator may be added to reagent A or B, before admixture thereof, with the same result.

Admixture of the acid and basic jellies is preferably effected within the body cavity to be medicated, and for this purpose an applicator device such as that shown on the accompanying sheet of drawing may be conveniently employed.

The applicator may comprise a tube portion and a nozzle member adapted to be mounted upon the tube and to be inserted into the body cavity.

The tube is double walled in character, comprising spaced inner and outer tubes 11 and 12. One of the two reagent jellies, for example, the acid jelly is contained in the inner tube 11, while the outer tube 12 (that is the space between the tubes) is filled with the base-containing jelly. Suitable means 13 is provided for simultaneously squeezing the jellies out of the tubes to cause intimate mixture thereof, with resultant liberation of gas and formation of foam.

Nozzle 14, threadedly mounted upon threaded end 15 of the tube, may be inserted into the body cavity before discharging the jellies from the tube. Upon such discharge, the contents of the two chambers of the tube come together, and the admixture quickly expands into an extremely tenacious, stable foam, shown somewhat diagrammatically at 16 in Fig. 2 which spreads throughout every crevice and fold of the cavity, e. g. the vaginal tract, being medicated.

By including suitable antiseptics, such as the methylester, propylester and benzylester of paraoxybenzoic acid (which are non-toxic and non-irritating but which have high phenol coefficients), the entire wall or tissue of the cavity may be thoroughly antisepticized.

Having described the invention, what is claimed is:

1. Process for the production of a tenacious acid jelly adapted to be used in the production of stable foam comprising converting karaya gum into jelly form by treating it with trisodium phosphate, and subsequently rendering the jelly acid in reaction without destroying its jelly character by the addition of boric acid.

2. A jelly-like composition adapted for use in the production of a stable and tenacious self developing foam comprising gum karaya, a boron-containing compound selected from the group consisting of boric acid and borates, and glycerin.

3. In a process for the production of a stable and tenacious self developing foam by the interaction of an alkaline jelly and an acid jelly, said jellies having a karaya gum base, said acid jelly comprising an activatable constituent of the group comprising boric acid and borates and said alkaline jelly comprising a carbonate, the steps of incorporating a neutral activating agent of the group comprising glycerin, manitol and invert sugar into said acid jelly, and subsequently effecting admixture of the two jellies.

4. In a process for the production of a stable and tenacious self expanding foam from an alkaline jelly, which contains potential foam forming gas in the form of a carbonate, and a second jelly, which contains an activatable constituent of the group comprising boric acid and borates, said jellies having a karaya gum base, the step of incorporating an activating agent of the group comprising glycerin, manitol and invert sugar into said second jelly, whereby upon admixture of the two jellies a copious evolution of gas is produced.

5. Process for the production of a tenacious acid jelly adapted to be used in the production of stable foam comprising converting a karaya gum base into tenacious jelly form by treating it with an alkaline compound, and subsequently rendering the said jelly acid in reaction without destroying its tenacious jelly character by the addition of a normally weakly acid substance of the group comprising boric acid and the salts of boron, said substance having been rendered more strongly acid in character by incorporation with a normally neutral activating substance of the group comprising glycerine, manitol and invert sugar.

6. The method of producing a stable and tenacious self developing foam comprising adding a neutral activating agent of the group comprising glycerin, manitol and invert sugar, to a boron-containing compound of the group comprising boric acid and borates, whereby the latter is able to produce a distinctly acid reaction, and admixing the activated compound with a base comprising gum karaya and a carbonate adapted to react with said activated compound to liberate a gas.

CLAUSS B. STRAUCH.